Jan. 2, 1945.  D. L. BENTON  2,366,430
GAUGE DEVICE
Filed July 26, 1943
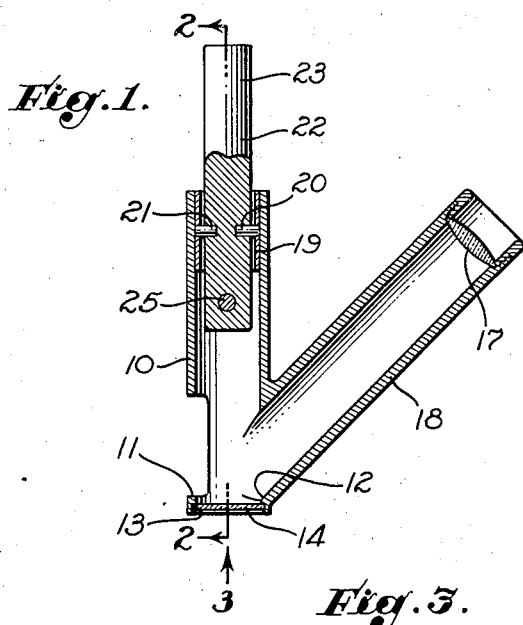
Fig.1.
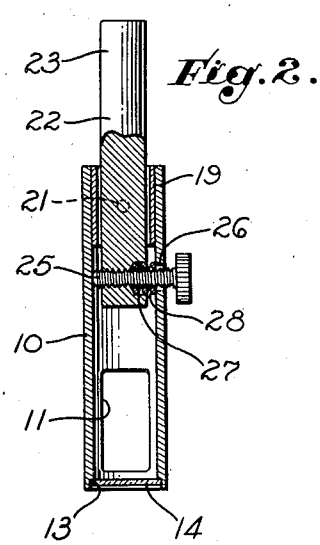
Fig.2.
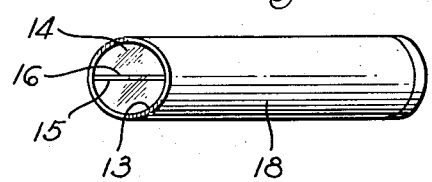
Fig.3.
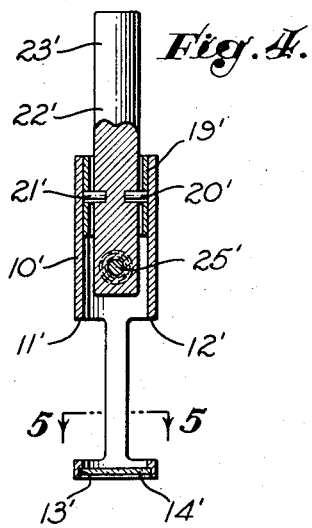
Fig.4.
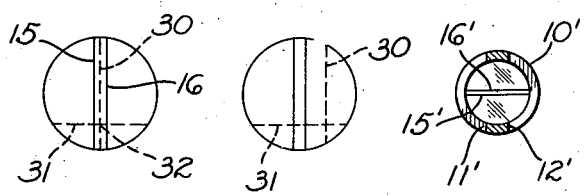
Fig.6.  Fig.7.  Fig.5.
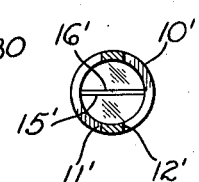
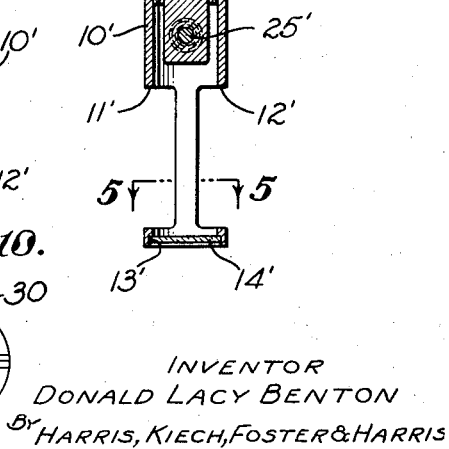
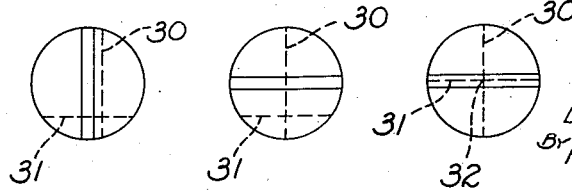
Fig.8.  Fig.9.  Fig.10.
INVENTOR
DONALD LACY BENTON
BY HARRIS, KIECH, FOSTER & HARRIS
FOR THE FIRM
ATTORNEYS.

Patented Jan. 2, 1945

2,366,430

UNITED STATES PATENT OFFICE 2,366,430

GAUGE DEVICE

Donald Lacy Benton, Los Angeles, Calif.

Application July 26, 1943, Serial No. 496,124

9 Claims. (Cl. 33—46)

My invention relates to the art of gauges, and more particularly to gauges adapted for such operations as centering, truing, laying out, inspecting, testing, and measuring in machine shop practice. Although this is the preferred field of use of my invention, and although the invention is described in connection therewith, it will be understood that this is for the purposes of illustration only and I do not intend to be limited to such field of use.

The primary object of my invention is to provide a simple and reliable gauge that can be used readily by an unskilled operator for machine shop operations, such as, for example, centering of the work in a lathe or press, to produce accurate results in a minimum time. Although my gauge is extremely simple and cheap to manufacture, tests with unskilled operators have indicated that the device is accurate to less than two one-thousands (.002) of an inch, which is sufficient accuracy for most machine shop practice.

As is well known in the art, machine tools, such as, for example, a drill press or lathe, have a support for the work piece and a tool holder for holding a cutting tool to be used. The tool holder is ordinarily rotatable relative to the work piece support, and, as is also well known, the cutting tool rotates in a circular orbit about the operating axis of rotation if the tool holder is not accurately aligned. This aberration caused by the inaccurate aligning of the tool holder is commonly termed "run-out" and causes much difficulty in accurately setting up a drilling or cutting operation, as it varies with different machine tools and must be determined anew for each work set-up. Therefore, it is an important object of my invention to provide a gauge which may be easily operated to locate the true center of the run-out orbit, or, in other words, the operating axis of the tool holder, relative to the work piece, regardless of the run-out of any particular machine.

Other objects and advantages will appear from the following specification and the drawing, which are for the purposes of illustration only and in which:

Fig. 1 is a vertical sectional view taken through a preferred embodiment of my invention.

Fig. 2 is a vertical sectional view taken on the line 2—2 of Fig. 1.

Fig. 3 is a bottom view taken in the direction of the arrow 3 of Fig. 1.

Fig. 4 is a vertical sectional view, generally similar to Fig. 1, taken through an alternative embodiment of my invention.

Fig. 5 is a cross-sectional view taken on the line 5—5 of Fig. 4.

Figs. 6 to 10, inclusive, are diagrammatic views of the field of the invention, used in explanation of its use, showing different steps in a centering operation.

Referring to Figs. 1, 2, and 3 of the drawing, I show a cylindrical housing 10 having windows 11 and 12 formed adjacent one end thereof and being disposed diametrically opposite therein. Disposed rigidly in that end of the cylindrical housing 10, preferably in an annular recess 13, is an indicating means of my invention, which in the preferred form comprises a circular transparent disk 14 formed of transparent plastic or glass, and having marked thereon parallel cross-hairs 15 and 16, as best shown in Fig. 3. The cross-hairs 15 and 16 are preferably disposed about three one-hundredths (.03) of an inch apart, although obviously this spacing may be varied as desired.

Registering with the window 12 is a tubular eyepiece member 18 which is preferably formed integrally with the cylindrical housing 10, although, obviously, it may be separately secured thereto if desired. The tubular eyepiece member 18 is disposed at an acute angle from the axis of the cylindrical housing 10 and is aligned so that an operator may look through it to see a field of vision including the cross-hairs 15 and 16 of the indicating means. Secured in the tubular eyepiece member 18 is an optical magnifying means, which in this case is a double convex lens 17 adapted to magnify the image of the cross-hairs 15 and 16. Since the window 11 is diametrically opposite to the window 12, ample top light falling on the upper face of the disk 14 is assured so as to permit the use of the tubular eyepiece member 18. Inspection of the upper surface of the indicating means may also be made through the window 11 if desired.

Secured in the upper end of the cylindrical housing 10, as by a press-fit or otherwise, is a sleeve member 19 having diametrically disposed pivot pins 20 and 21 secured therein and extending inwardly into the lower portion of a shank member 22, the upper end 23 of which is adapted to be secured in a tool holder of a lathe or other machine tool. As will be apparent, the pivot pins 20 and 21 pivotally support the cylindrical housing 10 on the shank member 22, and the cylindrical housing 10 in turn forms a supporting means for the indicating means which includes the disk 14.

As best shown in Fig. 2, a knurled thumbscrew 25 projects through an opening 26 formed in the cylindrical housing 10 and is threaded through the lower end of the shank member 22. An annular cavity 27 is formed around the thumbscrew 25 in the shank member 22 and retains a small compression spring 28 which tends to rotate the shank member 22 in a clockwise direction relative to the cylindrical housing 10 when viewed in the position shown in Fig. 2. Although the cylindrical housing 10 and the shank member 22 are connected in substantial alignment by the pivot pins 20 and 21, it will be obvious that rotation of the thumbscrew 25 will rotate the housing relative to the shank member for a purpose to be described hereinafter. It will also be apparent that the spring 28 maintains the inner end 29 of the thumbscrew 25 in engagement with the inner wall of the housing 10.

An alternative form of the invention is illustrated in Figs. 4 and 5, which is very similar to that illustrated in Figs. 1, 2, and 3, except that it does not include the tubular eyepiece 18 shown in Fig. 1. In the form shown in Figs. 4 and 5, similar parts are given the same numbers with the suffix prime as the numbered parts in the preceding figures, and the foregoing description will also apply to such later figures except as follows. No tubular eyepiece is provided in the form shown in Fig. 4, and the housing 10' is formed with longer windows 11' and 12' than are shown in Fig. 1. The windows 11' and 12' also are larger than those illustrated in Fig. 1. The devices are used in identically the same fashion, as will now be described.

As will be understood from the foregoing description, my invention may be used as a centering device for centering properly a piece of work relative to the tool holder of a drill press. Preparatory to the centering procedure, the desired center of the hole to be drilled in the work piece is indicated by marking on the work piece in the desired location two lines intersecting each other perpendicularly, as indicated diagrammatically by the dotted reference lines 30 and 31 in Figs. 6 to 10, inclusive, which is a well known procedure as will be understood by those skilled in the art. The work piece having the reference lines 30 and 31 thereon is then moved to a position in which the point of intersection 32 of these lines is approximately aligned with the axis of the tool holder of the drill press. My gauge is then inserted into and secured in the tool holder of the drill press exactly like any drill or other tool, as is well known in the art, the upper end 23 of the shank member 22 being thus secured in the press. The head of the drill press is then moved toward the work piece, carrying with it the cylindrical housing 10, until the reference lines 30 and 31 on the work piece are visible through the tubular eyepiece 18 of my device. As will be apparent, this means that the disk 14 of my indicating means is positioned only a fraction of an inch from the work piece. As will be apparent, it may be necessary to move the work piece somewhat until the reference lines 30 and 31 are visible through the tubular eyepiece 18. The initial step in the centering procedure is to orient the cross-hairs 15 and 16 either with the reference line 30 or the reference line 31, and then to maneuver that reference line into a central position between the two parallel cross-hairs. For convenience of description, the orientation of the reference line 30 between the cross-hairs will be described, as this is illustrative. To accomplish this end, the work piece is moved to bring the point of intersection 32 into the field of vision through the tubular eyepiece 18. Precise orientation and centralization may involve slight axial rotation of the gauge, slight movement of the work piece relative thereto, and perhaps slight adjustment of the thumbscrew 25, which latter, as will be observed, causes the indicating means including the cross-hairs 15 and 16 to be moved slightly relative to the work piece. When this first step is completed, the cross-hairs 15 and 16 will straddle one of the reference lines, which in the case shown in Fig. 6 is the reference line 30.

The reference line 31 may be regarded as representing a first dimension across the work piece, the reference line 30 representing a second dimension across the work piece rotated from the first dimension by less than 180°. In the present procedure, correction for run-out is first made with regard to the reference line 30, but the direction of relative movement is along the first dimension or line 31. Thereafter, correction is made along the second dimension.

The second step in the centering procedure is to rotate the gauge 180°, and if the tool holder has any "run-out" such rotation causes the reference line 30 apparently to move to a position in the field of vision through the tubular eyepiece 18 which is spaced from the cross-hairs 15 and 16, as shown in Fig. 7.

In the third step, while the operator watches the field of vision through the tubular eyepiece 18, the thumbscrew 25 is rotated until the cross-hairs 15 and 16 shift toward the reference line 30 a distance such that the apparent distance between the center between the cross-hairs and the reference line 30 is one-half that shown in Fig. 7. The whole field of vision, of course, shifts with lateral movement of the cross-hairs 15 and 16, so that the reference lines 30 and 31 appear to the operator as making the relative movement instead of the cross-hairs 15 and 16, and the field of vision at the end of this step has the appearance shown by Fig. 8.

In the fourth step of the procedure, the operator, while watching the field of vision through the tubular eyepiece 18, shifts the work piece until the reference line 30 is again symmetrically straddled by the cross-hairs 15 and 16, and at the completion of this step the field of vision appears again as shown in Fig. 6. It will be apparent that the spacing between the reference line 30 and the center of the cross-hairs 15 and 16, as shown in Fig. 7, is taken up by the movement of the line of sight relative to the work piece, and to an equal extent by movement of the work piece relative to the line of sight. At this point the operator may check the accuracy with which the last steps have been performed by rotating the gauge 180° to determine whether the field of vision still has the appearance shown in Fig. 6. If the reference line 30 is displaced from the center of the cross-hairs 15 and 16, the preceding two steps may then be repeated until the reference line 30 remains in the center between the cross-hairs 15 and 16 when viewed in either position of the tubular eyepiece 18.

The next, or fifth, step in the procedure of centering with my gauge consists of rotating the gauge 90° from its last position to a position in which the cross-hairs 15 and 16 are parallel with the reference line 31, the field of vision then appearing as indicated in Fig. 9. Adjustment up to this point has been along or in the direction of the dimension represented by the reference line 30, whereas the intention now is to provide correction along or in the direction of the dimension represented by the line 31. To make this final correction, the operator shifts the work piece in a direction perpendicular to the instant direction of the cross-hairs 15 and 16, to change the field of vision from the appearance illustrated in Fig. 9 to that illustrated in Fig. 10, in which the cross-hairs 15 and 16 symmetrically straddle the reference line 31, thereby placing the intersection 32 of the reference lines 30 and 31 at precisely the center of the field of vision. The intersection point 32 of the reference lines 30 and 31 is, in this position, precisely on the operational axis of the tool holder of the drill press. This may readily be checked by again rotating the gauge 180° from the position in which the field of vision appears as in Fig. 10. If, upon such rotation, the reference line 31 appears to move away from its centered position between the cross-hairs 15 and 16, the work may then be centered in this dimension by following steps 3 and 4, inclusive, as applied in this dimension. When this is completed, the work piece is accurately centered relative to the tool holder of the drill press so as to compensate for run-out of the drill press.

The foregoing method of use of my gauge forms no part of the present invention, it having been developed for the use of other instruments. It is, however, illustrative of a preferred method of using the invention.

As will be understood, both embodiments illustrated and described of my invention may be used in the same fashion. The gauge illustrated in Figs. 1 to 3, inclusive, due to magnification of the field of vision by the lens element 17, is considerably more accurate than the form shown in Figs. 4 and 5. With either form, however, centering accuracy to within two one-thousandths (.002) of an inch may be obtained by an unskilled and inexperienced operator without difficulty.

As will be understood, the foregoing described embodiments are merely illustrative, and I do not intend to be limited to the constructions set forth therein, as substitutions of the various parts and elements may be made without departing from the spirit of my invention. For example, although I have shown cross-hairs 15 and 16 as essential parts of the indicating means of my invention, it will be obvious to those skilled in the art that other forms of center indicating means may be substituted for the cross-hairs without departing from my invention. Consequently, I desire to be afforded the full scope of the following claims.

I claim as my invention:

1. In a gauging device, the combination of: a shank member adapted to be secured in a tool holder; visual indicating means; means for supporting said indicating means on said shank member so that said indicating means may be moved transversely to the axis of said shank member and in a predetermined linear direction; and means for so moving said indicating means relative to said shank member.

2. In a gauging device, the combination of: a shank member adapted to be secured in a tool holder and having a longitudinal axis; visual indicating means; means for pivotally supporting said indicating means on said shank member so that said indicating means may be rotated about an axis transverse to said longitudinal axis; and means operatively connected between said shank member and said indicating means for so rotating said indicating means.

3. In a gauging device, the combination of: a cylindrical housing having a longitudinal axis; a shank member adapted to be secured in a tool holder; means for securing one end of said housing to said shank member in substantial axial alignment therewith; visual indicating means including a reference mark carried by the other end of said housing, said indicating means being visible to an operator from a point eccentric to said axis; and means for moving said indicating means to shift said reference mark transversely relative to said axis.

4. In a gauging device, the combination of: a cylindrical housing having a longitudinal axis; a shank member adapted to be secured in a tool holder; means for rotatably securing one end of said housing to said shank member in substantial axial alignment therewith; visual indicating means carried by the other end of said housing, said indicating means being visible to an operator from a point eccentric to said axis; and means for rotating said housing about an axis transverse to said longitudinal axis.

5. In a gauging device, the combination of: a cylindrical housing having a portion thereof adjacent one end cut away to provide a window for vision therethrough of said end; a shank member adapted to be secured in a tool holder; means for movably securing the other end of said housing to said shank member in substantial alignment therewith; visual indicating means carried by said one end of said housing and visible through said window from the outside of said housing; and means for moving said housing transversely relative to said shank member to move said indicating means into or out of alignment with said shank member.

6. In a gauging device, the combination of: a cylindrical housing having a portion thereof adjacent one end cut away to provide a window for vision therethrough of said end; a shank member adapted to be secured in a tool holder and having a longitudinal axis; means for rotatably securing the other end of said housing to said shank member in substantial alignment therewith; visual indicating means carried by said one end of said housing and visible through said window; and means for rotating said housing about an axis transverse to said longitudinal axis.

7. In a gauging device, the combination of: a shank member adapted to be secured in a tool holder and having a longitudinal axis; visual indicating means including a reference mark positioned in a plane substantially normal to said axis and substantially aligned with said axis; means for supporting said indicating means on said shank member; and means for moving said indicating means and said reference mark in said plane transversely to said axis.

8. In a gauging device, the combination of: a cylindrical housing; a pair of diametrically disposed windows therein adjacent one end of said housing; a shank member adapted to be secured in a tool holder and having a longitudinal axis; means securing the other end of said housing to said shank member for relative pivotal movement about an axis transversely of said longitudinal axis; visual indicating means carried by said one end of said housing and visible through both of said windows; and means for moving said housing relative to said shank member so as to transversely displace said indicating means relative to said shank axis.

9. In a gauging device, the combination of: a cylindrical housing; a pair of diametrically disposed windows therein adjacent one end of said housing; a shank member adapted to be secured in a tool holder and having a longitudinal axis; means securing the other end of said housing to said shank member for relative pivotal movement about an axis transversely of said longitudinal axis; visual indicating means carried by said one end of said housing and visible through both of said windows; means for moving said housing relative to said shank member so as to transversely displace said indicating means relative to said shank axis; a tubular eyepiece mounted on said housing and axially aligned with one of said windows and said indicating means; and optical magnifying means in said eyepiece adapted to magnify visually said indicating means when viewed through said eyepiece.

DONALD LACY BENTON.